(12) United States Patent
Richards (10) Patent No.: US 7,159,837 B2
(45) Date of Patent: Jan. 9, 2007

(54) PLUG BAFFLE DEVICE FOR MOLD

(76) Inventor: Leslie W. Richards, 2735 N. Britton Rd., Union Grove, WI (US) 53182

( * ) Notice: Subject to any disclaimer, the term of this patent is extended or adjusted under 35 U.S.C. 154(b) by 113 days.

(21) Appl. No.: 10/600,373

(22) Filed: Jun. 20, 2003

(65) Prior Publication Data

US 2004/0256537 A1     Dec. 23, 2004

(51) Int. Cl.
*B29C 45/73* (2006.01)
(52) U.S. Cl. .................. 249/205; 249/79; 425/552
(58) Field of Classification Search ............. 249/79, 249/205; 425/552; 138/38; 165/DIG. 525
See application file for complete search history.

(56) References Cited

U.S. PATENT DOCUMENTS

| | | | | |
|---|---|---|---|---|
| 2,770,011 | A | * | 11/1956 | Kelly ................... 425/563 |
| 3,548,863 | A | * | 12/1970 | Stippich ................ 137/340 |
| 3,760,874 | A | * | 9/1973 | Boskovic .............. 165/177 |
| 4,800,953 | A | * | 1/1989 | Veldhoff ............... 165/142 |
| 4,966,544 | A | * | 10/1990 | Mitake ................. 425/552 |
| 5,474,122 | A | | 12/1995 | Pierce |
| 5,761,808 | A | | 6/1998 | Patel et al. |
| 5,860,472 | A | | 1/1999 | Batchelder |
| 5,915,464 | A | | 6/1999 | Kalbacher et al. |
| 5,945,140 | A | * | 8/1999 | Lin ...................... 425/552 |
| 6,026,801 | A | | 2/2000 | Barkan |
| 6,168,415 | B1 | * | 1/2001 | Pleasant et al. ........ 425/552 |
| 6,276,922 | B1 | | 8/2001 | Huston et al. |

FOREIGN PATENT DOCUMENTS

| | | | |
|---|---|---|---|
| JP | 06-182770 | * | 6/1994 |
| JP | 08-258046 | * | 8/1996 |
| JP | 11-42644 | * | 11/1999 |

OTHER PUBLICATIONS

Computer translation and English abstract for JP 06-182770.*
Computer translation and English abstract for JP 08-258046.*
Computer translation and English abstract for JP 11-42644.*

* cited by examiner

*Primary Examiner*—Donald Heckenberg
(74) *Attorney, Agent, or Firm*—Jansson, Shupe, Munger & Antaramian, Ltd.

(57) ABSTRACT

A plug baffle device for installation in a coolant passage within a mold, the plug baffle device having its coolant-encountering blade mechanically attached to a base member, and methods for making such plug baffle device. Advantages include acceptance of greater torque and less susceptibility to damage from high torque. In certain highly preferred embodiments, the base member includes an extension portion facilitating mechanical engagement and providing other substantial advantages.

22 Claims, 5 Drawing Sheets

PLUG BAFFLE DEVICE FOR MOLD

FIELD OF THE INVENTION

This invention is related generally to plug baffle devices for directing coolant flow and, more particularly, to plug baffle devices for installation in coolant passages of molds.

BACKGROUND OF THE INVENTION

For more than fifty years plug baffle devices used in injection molds have been produced by soldering cut-to-length, flat bar stock onto the flat end of a standard, commercially available threaded plug, the flat stock forming a fin-like blade to direct the flow of coolant flow in a coolant passage of a mold. Commercially available standard pipe plugs are manufactured to dimensions according to the American Standard Taper Pipe Thread System for the purpose of sealing tapered pipe thread holes. They are currently used in plug baffle devices due to their availability and low cost. Plug baffle devices are typically made of brass due to its preferable qualities of corrosion resistance and heat expansion. Currently-available plug baffle devices typically have Allen-head wrench sockets extending longitudinally into their plug bases.

Brass pipe plugs are produced by a cold-forming process. Brass cannot be heat treated, but can be work-hardened. In the cold-forming process, a brass plug is work-hardened by the deformation or movement of material. In one stroke, a brass plug is forged from a round blank into its finished shape. Threads on the plug are then formed in a secondary roll threading operation. This formed plug is, therefore, in a work-hardened condition.

With this background in mind, it is noted that typical plug baffle devices have three specific drawbacks:

First, brass is susceptible to annealing when subjected to soldering temperatures and, upon soldering attachment of the fin-like blade to the base member, such annealing softens the brass. This creates a weak hex wrench socket that is subject to rounding or stripping out when substantial torque is applied.

Second, current plug baffle devices have shallow Allen-wrench sockets. This is due to the fact that commercially-available plugs, including those used in plug-baffle devices, are designed simply to plug holes without obstructing fluid flow. The solder joint surface of the plug portion of such typical plug baffle device is typically flat, with the result that there is nothing to accommodate any deeper wrench socket.

Third, the use of soldering for attachment of the plug baffle blade to the plug portion of the typical plug baffle device means that experienced operators are required for assembly of such devices; indeed, a high level of soldering skill is necessary to meet the typical tight tolerances within mold cooling chambers and the requirements of perpendicular attachment and precise rotational concentricity.

In operation, tapered threaded plug bases of plug baffle devices are threaded into corresponding mold ports until tight. The torque applied is enough to provide leak-free installation. Then, the plugs must be turned further (over-torqued) to align properly the blade with respect to the coolant flow within the chamber. This is due to the fact that pipe plugs cannot be torqued tightly and then reversed, since this would lead to possible leakage. Hence, plug baffles cannot be "backed up" to align the blade within the chamber.

When plug baffle devices are subjected to high heat during molding operations, the brass plug portions, which are of course subject to thermal expansion, become even more tightly seated in their respective ports. Moreover, any pipe dope or thread lubricant often disintegrates by virtue of the heat of molding operations. Thus, there is a high rate of seizing or sticking of the plugs to the ports and a high rate of damage to seized plugs in attempting removal when necessary for cleaning, maintenance, or replacement purposes. The high levels of torque required to remove plug baffle devices in these cases often result in plugs having to be drilled out for removal. This drill-out procedure results in significant cost, along with downtime for the injection-mold or die-casting die.

A plug baffle device that is able to withstand higher installation torque and is less susceptible to failure upon removal would be an important improvement in the art.

OBJECTS OF THE INVENTION

It is an object of the invention to provide an improved plug baffle device overcoming some of the problems and shortcomings of the prior art, including those referred to above.

Another object of the invention is to provide a plug baffle device which is made without the annealing effect of thermal joining processes.

Still another object of the invention is to provide a plug baffle device with a deeper Allen (hexhead) socket for receipt of a tool for removal of the plug baffle device.

It is another object of the invention is to provide a plug baffle device to which greater torque may be applied for removal of the plug baffle device from its installation in a mold.

Yet another object of the invention is to provide a plug baffle device which is less susceptible to damage of its plug base.

Another object of the invention is to provide a plug baffle device reducing downtime of the valuable molding machinery in which the plug baffle device is installed.

Another object of the invention is to provide a plug baffle device that is assembled without the use of solder and a method of making a plug baffle device without the use of solder.

How these and other objects are accomplished will become apparent from the following descriptions and the drawings.

SUMMARY OF THE INVENTION

The invention involves a plug baffle device for installation in a coolant passage of a mold. The plug baffle device includes a base member and a coolant-encountering fin-like blade (or "fin") that is mechanically attached to a base member. The term "mechanical" as used herein means a physical junction created by other than soldering, welding, or another process using heat sufficient for metal softening purposes. The base member, of course, includes the mold-connecting portion, which (as in prior devices) is typically threaded.

Certain preferred mechanical attachments are through mating connections. Such mating connections include mating through a male interconnecting member and a female interconnecting member.

In one highly preferred embodiment, the male interconnecting member is integral with the coolant-encountering blade and the female interconnecting member is part of the base member. It is most preferable for the female interconnecting member to have a fin-receiving channel, such fin-receiving channel having a cross-section. The male interconnecting member has a base-engaging portion with a cross-section which is complementary to the cross-section of the fin-receiving channel of the female interconnecting member. In one such arrangement, the base-engaging-portion cross-section is T-shaped. The term "T-shaped" as used herein includes illustrated features in the drawings which can also be described as "I-shaped."

As in the prior art, the mold-connecting portion of the base member is substantially cylindrical and has a threaded outer surface with pipe threading. The base member has a base-member first end which has a tool-engaging socket for a hexhead wrench (Allen wrench) and an opposite fin-engaging second end. In this invention, it is highly preferred for the base member to include an extension portion that extends from the second end. Such extension portion preferably forms the preferred female interconnecting member.

The addition of such an extension portion allows for a deeper socket than is allowed in devices of the prior art, while maintaining the same thread dimensions and characteristics. It is preferred that the axial (i.e., longitudinal) socket depth be at least 80%, and most preferably at least 90%, of the axial length of the threaded outer surface of the base member. It was discovered that such an extension portion can allow, e.g., 33% more wrench engagement (depth) and that this increased depth allows up to about three (3) times the available wrenching torque when comparing with plug baffle devices of the prior art.

The extension portion of preferred embodiments of this invention preferably narrows in its cross-dimension toward the blade, and this can provide lateral flow space adjacent to the plug baffle device. In some situations, this embodiment will facilitate coolant flow as the flow encounters the baffle and then, after passing first along one and then along the other side of the baffle, moves away from the baffle upon exiting the chamber.

Another aspect of the invention involves the female fin-receiving portion of the base member defining a concave fin-receiving space for mechanical attachment of the fin-like blade. In certain of such preferred embodiments the concave fin-receiving space is dimensioned to snugly engage the base-member-engaging portion of the fin. The term "snugly" means that the concave fin-receiving portion contacts the base-member-engaging portion in a manner serving to hold the base-member-engaging portion; the term includes, but is not limited to pressure fits and tolerance fits.

In certain embodiments it is preferred that the female fin-receiving portion of the base member have an axially-facing entrance into the fin-receiving space which it defines. While such entrance has a first cross-sectional area, the fin-receiving space has a second cross-sectional area spaced inwardly from the entrance which is greater than the first cross-sectional area. The base-member-engaging portion of the fin has a third axial cross-sectional area which is greater than the first cross-sectional area, thereby preventing axial disengagement of the fin from the base member when the two components are engaged. The term "entrance" as used herein refers to the distal (or end) location of the first cross-sectional area and has no bearing on the direction from which engagement is achieved (whether axially or trans-axially).

In another preferred embodiment, the base-member-engaging portion of the fin has a trans-axial cross-sectional shape which is substantially constant along at least a segment of its width and the fin-receiving space of the base member is a trans-axial channel configured and arranged to be substantially complementary to the base-member-engaging portion. While the longitudinal cross-section of the base-member-engaging-portion can be any shape, it is preferable that it be either T-shaped.

As in plug baffle devices of the prior art, the fin is preferably made of brass. It is most preferred that the base member also be made of brass. In one preferred embodiment, the fin-like blade (or "fin") has a coolant-contacting portion which is plate-like. In another, the fin-like blade has a coolant-contacting portion which is helical.

Another aspect of this invention is a method for making a plug baffle device. The method involves: (a) providing a fin (or "blade") which has a first-end portion with a male base-member-engaging configuration; (b) providing a base member which has a trans-axially extending female fin-engaging channel; and (c) urging the fin first-end portion trans-axially into the fin-receiving channel. In this way, the fin is in tight mechanical engagement with the base portion.

In this method, it is preferred that the base-member-engaging portion of the fin have a trans-axial cross-sectional shape which is substantially constant along at least a segment of the width thereof, as described above. It is also preferred that the female fin-receiving portion define a trans-axial fin-receiving channel which is configured and arranged to be substantially complementary to the base-member-engaging portion, as described above. It is highly preferred that the trans-axial cross-sectional shape be T-shaped.

Yet another aspect of the invention is a method for making a plug baffle device including the following steps: (a) providing a base member of a first metal, the base member defining a fin-receiving space which has an axially-facing entrance of first cross-sectional area, the fin-receiving space having a second cross-sectional area axially spaced from the entrance, the second cross-sectional area being greater than the first cross-sectional area; (b) providing a fin having a base-member-engaging portion at a proximal end thereof and a remote distal end, the base-member-engaging portion being of a second metal softer than the first metal and having a third axial cross-section dimensioned to pass through the entrance; and (c) inserting the base-member-engaging portion of the fin through the entrance and into the space, the fin-receiving space and base-member-engaging portion being configured and arranged to prevent axial disengagement of the fin from the base member.

The term "softer" as used herein with respect to metal means more malleable or subject to deformation. The phrase "dimensioned to pass through the entrance" as used herein means includes the following: dimensioned smaller than the entrance to allow for easy passage or dimensioned slightly larger than the entrance to allow for forcing the softer-metal component into pressure fit with the entrance. "Space" means any portion of the cavity interior of the entrance.

In such method, it is preferred that the fin-receiving space have an inner surface opposite the entrance and the method include the following additional steps: (a) inserting the base-member-engaging portion of the fin until the proximal end of the fin is in contact with the inner surface; and (b) applying peening pressure axially to the distal end of the fin to cause the proximal end to deform. This enhances the mechanical engagement of the fin with the base member.

DETAILED DESCRIPTION OF PREFERRED EMBODIMENTS

Figure 1A:
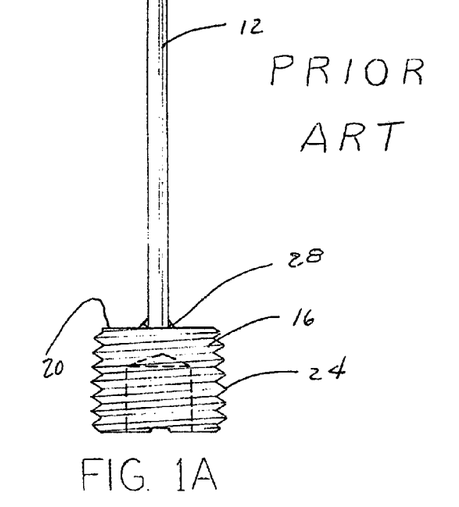
FIGS. 1A and 1B are front and side elevations, respectively, of a typical plug baffle device of the prior art.
Figure 1B:
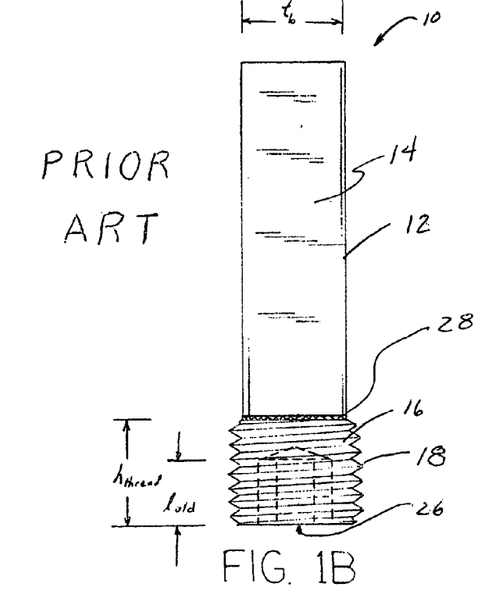

A plug baffle device 10 of the prior art is shown in FIGS. 1A and 1B. These prior plug baffle devices 10 are used in molding equipment having strategically placed cooling chambers 11 in a circulating-water cooling system, better seen in FIGS. 15 and 16. These cooling chambers 11 are cylindrical with a cross-sectional diameter, $d_1$, and have a water inlet, a water outlet, and a plug-baffle installation port through which the prior plug baffle device 10 may be inserted and into which prior plug baffle device 10 may be removably installed. Coolant enters the cooling chamber through the water inlet and leaves the cooling chamber through the water outlet, after passing by plug baffle device 10. By way of example only, such arrangements may be found in plastic injection mold machinery, die-casting dies or molds and permanent molds usually at core areas in these molds.

Prior plug baffle device 10 has a fin-like blade 12 for interaction in a cooling chamber 11 in the circulating-water cooling system. Blade 12 of prior plug baffle device 10 is soldered (by silver solder 28) to the flat end surface (or "deck") 22 of a plug base 16 which is engage in the installation port of the mold. Blade 12 has a front surface 14 dimensioned to have a transverse dimension, $t_b$, essentially equal to $d_1$. In Therefore, when plug baffle device 10 is installed in cooling chamber 11, circulating water 13 cannot pass around the sides of blade 12, but must move along it until it passes the end of blade 12 and flows back along the other side of blade 12.

Plug base 16 has an exterior surface 18 which is tapered from a base bottom 20 to deck 22, typically at a rate of ⅞ or ¾ inch per foot. Such taper facilitates insertion and sealing into an installation port of the cooling system. Along tapered exterior surface 18, plug base 16 has threads 24, typically standard NPT (National Pipe Taper) threads. Threads 24 extend along entire exterior surface 18 a thread distance $h_{thread}$. In this way, plug base 16 of prior plug baffle device 10 can be easily inserted into an installation port. Once loosely inserted, plug base 16 is then screwed into the tapered threaded port by means of an Allen wrench inserted into a socket 26 in plug base 16 until plug base 16 is tightly engaged—thereby creating a seal. Once sealing engagement is obtained, plug base 16 is further screwed (tightened) into the installation port until blade 12 is properly oriented in the cooling chamber by means of alignment grooves (or other such markings). To further assure the seal, pipe dope or tape (not shown) is often applied to threads 24.

Both blade 12 and plug base 16 are typically of brass for its non-corrosive and thermo-expansive qualities. When the injection mold and its cooling system heats up in operation, thermal expansion of plug base 16 causes plug base 16 to tighten its sealing engagement with the steel structure forming the installation port in the mold, thereby further guaranteeing a tight seal between plug base 16 and the installation port. As alluded to above, in practical experience the tight seal which is desirable in operation results in frequent breakage or stripping of the Allen wrench socket in attempts at removal of plug base 16 from its installation port.

Figure 2:
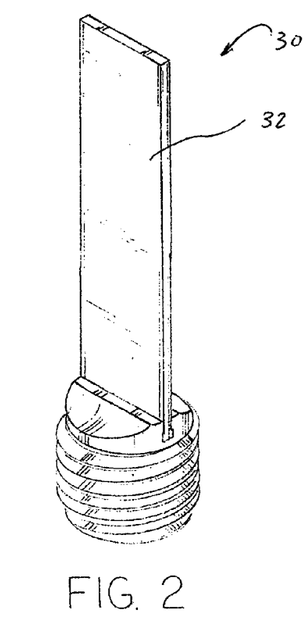
FIG. 2 is a perspective view of a plug baffle device which is a preferred embodiment of this invention.

Preferred plug baffle devices of this invention, which overcome the several problems of the prior art discussed above, will now be described in detail:

FIG. 2 shows a plug baffle device 30 which is a preferred embodiment of the invention. Plug baffle device 30 has a fin-like blade 32. Blade 32 is preferably of brass. As better seen in FIGS. 9, 10, 11, 13A, and 13B, blade 32 is a plate having a front face 34, back face 36, and side faces 38. Front and back faces 34, 36 are symmetric, although variations are possible. Each face 34, 36, has a transverse blade dimension, $t_b$, and a blade height, $h_b$. Transverse blade dimension $t_b$ is nearly equal to $d_1$. Blade height $h_b$ is measured from blade top end 40 to blade bottom end 42. Blade height $h_b$ is dimensioned to allow for water flow over blade top end 40 when plug baffle device 30 is installed in cooling chamber 11. Side faces 38 have a blade width $w_b$.

Figure 9:
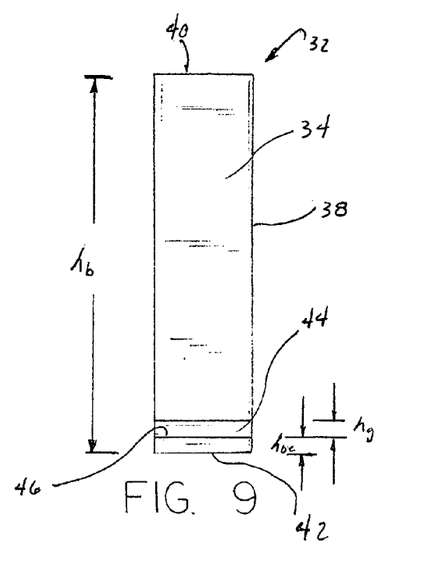
FIGS. 9 and 10 are front and side elevations, respectively, of the fin-like blade (or "fin") of the plug baffle device of FIG. 2, showing the grooves and I-shaped cross-sectional configuration.
Figures 10, 11:
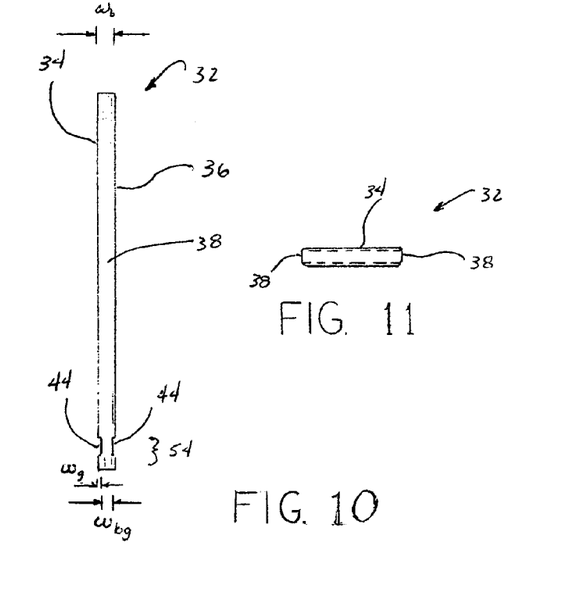
FIG. 11 is a bottom view of the blade of the plug baffle device of FIG. 2.

As seen in FIGS. 9 and 10, blade 32 has grooves 44 milled transversely along its entire front and back faces 34, 36. Bottom edges 46 of groove 44 are each located a blade-end distance $h_{be}$ from blade bottom end 42. Grooves 44 have a groove width $w_g$ and a groove height $h_g$. Blade 32 has a blade-groove width $w_{bg}$ between the two grooves which is equal to the blade width reduced by twice the groove-width dimension ($w_{bg}=w_b-2w_g$).

Figure 3:
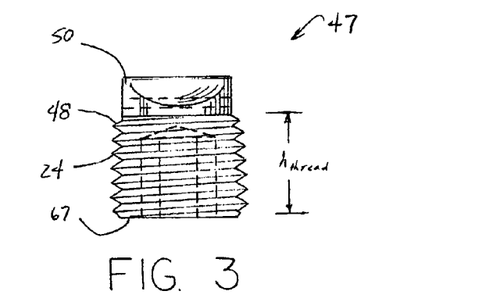
FIGS. 3 and 4 are front and side elevations, respectively, of the plug base portion of the plug baffle device of FIG. 2.
Figure 4:
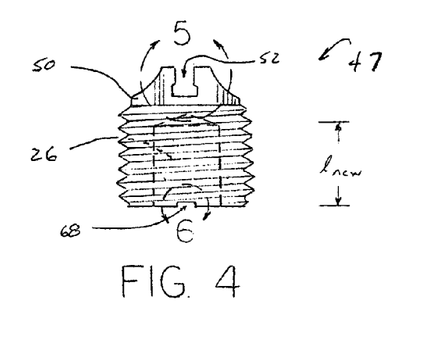
Figure 5:
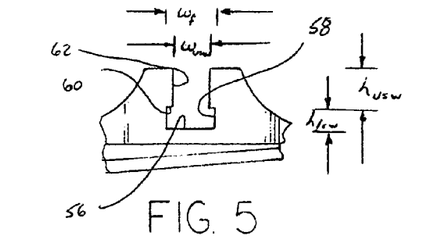
FIG. 5 is an enlarged fragmentary view of FIG. 4, as indicated by line 5—5 in FIG. 4, showing the channel.
Figure 6:
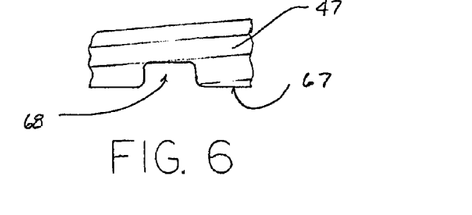
FIG. 6 is an enlarged fragmentary view of FIG. 4, as indicated by line 6—6 in FIG. 4, showing the indicator groove.
Figure 7:
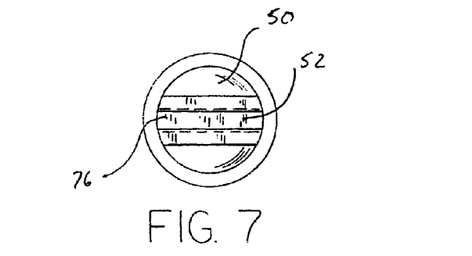
FIG. 7 is a top view of FIG. 3, showing the channel.

Turning now to FIG. 3, plug base 47 is tapered and threaded along an exterior surface 48 a thread distance $h_{thread}$ to facilitate insertion and sealing in installation port in the same manner as described above with respect to prior plug base 16. Plug base 47 is forged to have an extension portion 50. Extension portion 50 is laterally symmetric and transversely symmetric, and narrows in its cross-dimension toward blade 32, as best shown in FIGS. 2, 4 and 5. As noted above, this can facilitate the flow of coolant, depending upon the location of coolant flow openings in the mold.

As seen in FIG. 4, an engagement channel 52 is transversely machined into extension portion 50. Engagement channel 52 has a continuous longitudinal cross-section along its transverse dimension complementary in shape to the base-engaging portion 54 of blade 32 (seen in FIG. 10).

As better seen in FIG. 5, channel 52 is formed from floor 56, lower sidewalls 58, shoulders 60, and upper sidewalls 62, all of which run continuously transversely through extension portion 50. Floor 56 has a lateral floor width $w_f$ equal to blade width $w_b$. Rising from lateral opposite sides of floor 56 are parallel lower sidewalls 58. Lower sidewalls 58 have a longitudinal lower-sidewall height $h_{lsw}$ which is equal to blade end height $h_{be}$. Extending inwardly from lower sidewalls 58 into groove 44, above and parallel to floor 56, are shoulders 60. Shoulders 60 extend in from lower sidewalls 58 a shoulder-distance $w_s$ which is equal to groove-width dimension $w_g$. Extending upwardly from each shoulder 60 are parallel upper sidewalls 62. Upper sidewalls 62 extend up an upper-sidewall distance $h_{usw}$ which is less than or equal to groove height $h_g$. Upper sidewalls 62 are spaced from each other by an upper-sidewall-spacing distance $w_{usw}$, which is less than floor width $w_f$ and substantially equal to blade-groove width $w_{bg}$.

It has been found most practical to machine channel 52 from extension portion 50 out of a solid forged blank.

While the preferred embodiment described has in interlocking I-structure, it will be readily observed that any configuration that locks a larger portion of blade bottom end 42 by a bottleneck configuration of extension portion 50 will be suitable.

Figure 8:
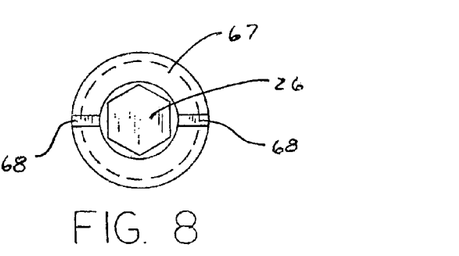
FIG. 8 is a bottom view of FIG. 3, showing the Allen wrench socket.

FIGS. 4 and 8 show Allen wrench socket 26 formed into plug-base bottom 67. Allen wrench socket 26 has a hexagonal cross-section with a longitudinal socket depth $1_{new}$. Because plug base 16 includes extension portion 50, longitudinal socket depth $1_{new}$ may be increased over the plug bases of prior plug baffle devices for a any given thread length $h_{thread}$. That is, for any given thread length $h_{thread}$, longitudinal socket depth $1_{new}$ will be significantly greater than longitudinal socket depth $1_{old}$ of plug baffle device 10 of the prior art (best seen in FIG. 1B).

By way of example, for a standard ⅜ inch plug of the prior art, the standard thread length $h_{thread}$ is 0.406 inch and the longitudinal socket depth $1_{old}$ is about 0.266 inch—or about 66% of thread length. For preferred plug baffle devices of this invention having a similar thread length (i.e., $h_{thread}$=0.406 inches), the longitudinal socket depth $1_{new}$ can easily be up to 0.37 inches—i.e., some 91% of thread length. By way of further example, for a standard ½ inch plug of the prior art, the standard thread length $h_{thread}$ is 0.531 inches and the longitudinal socket depth $1_{old}$ is about 0.329 inches—or about 62% of thread length. For preferred plug baffle devices of this invention having a similar thread length (i.e., $h_{thread}$=0.531 inches), the longitudinal socket depth $1_{new}$ can even be as much as 0.531 inches—i.e., 100% of thread length.

Although lesser socket depths than those just described will still be increased over socket depths of the prior art and will substantially increase the amount of torque that can be accepted, it is preferred that the axial (i.e., longitudinal) socket depth be at least 80% of the axial length of the threaded outer surface, and most preferably at least 90%.

With such deeper Allen wrench slot, greater torque may be applied to socket 26 without failure of the material. It has been found that sockets of the prior art which are, e.g., ¼–18 NPT pipe size will fail upon the application of 45 lbs. torque, while the sockets of the invention of the same pipe size can withstand over 150 lbs. torque. This is an important additional advantage of this invention.

Also seen in FIGS. 4 and 8 are indicator notches 68 extending into base end 70 of plug base 47. Indicator notches 68 are parallel with transversely-running channel 52. In this way, orientation of blade 32 within cooling chamber 11 can be ascertained by an installer through reference to indicator notches 68.

Figure 12:
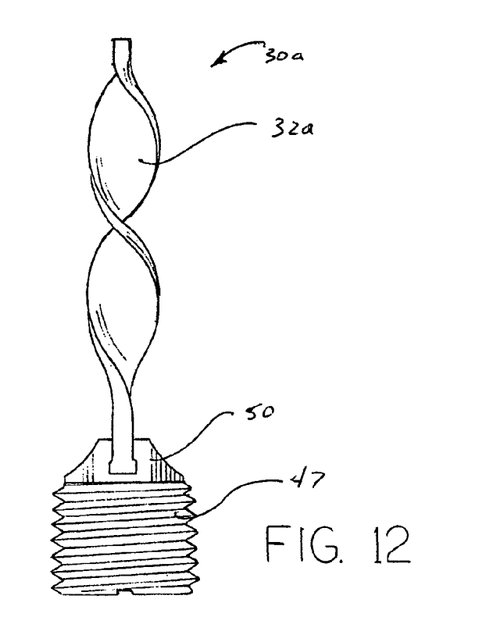
FIG. 12 is a side elevation of another plug baffle device of this invention, this one with a helical blade engaged with the plug base.

It must be observed that the cooling-water encountering portion need not be platelike. As seen in FIG. 12, plug baffle device 30a has a blade 32a, which is helical.

Figure 13A:
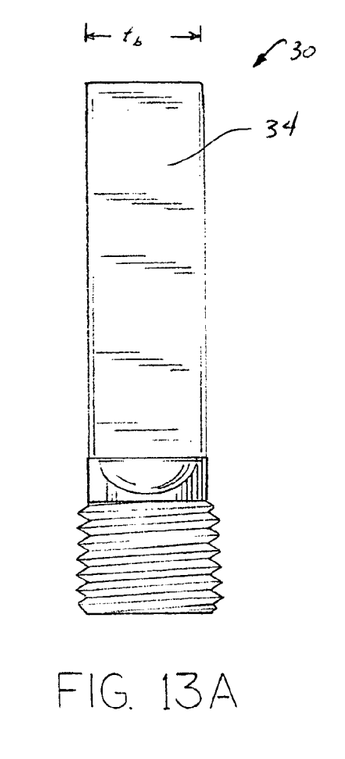
FIGS. 13A and 13B are front and side elevations, respectively, of the plug baffle device of FIG. 2.
Figure 13B:
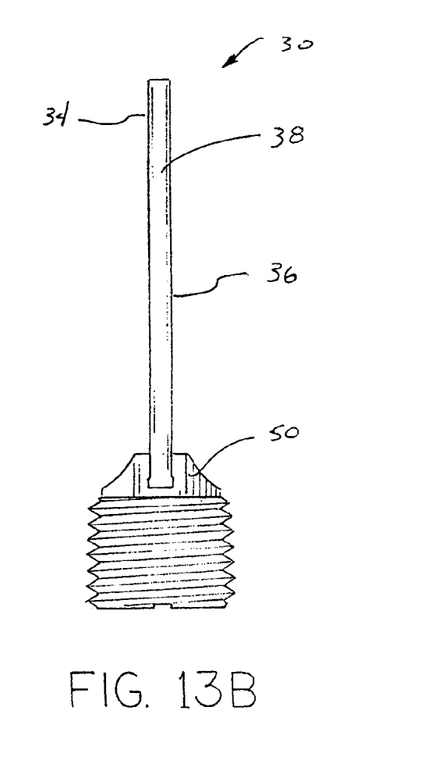
Figure 14:
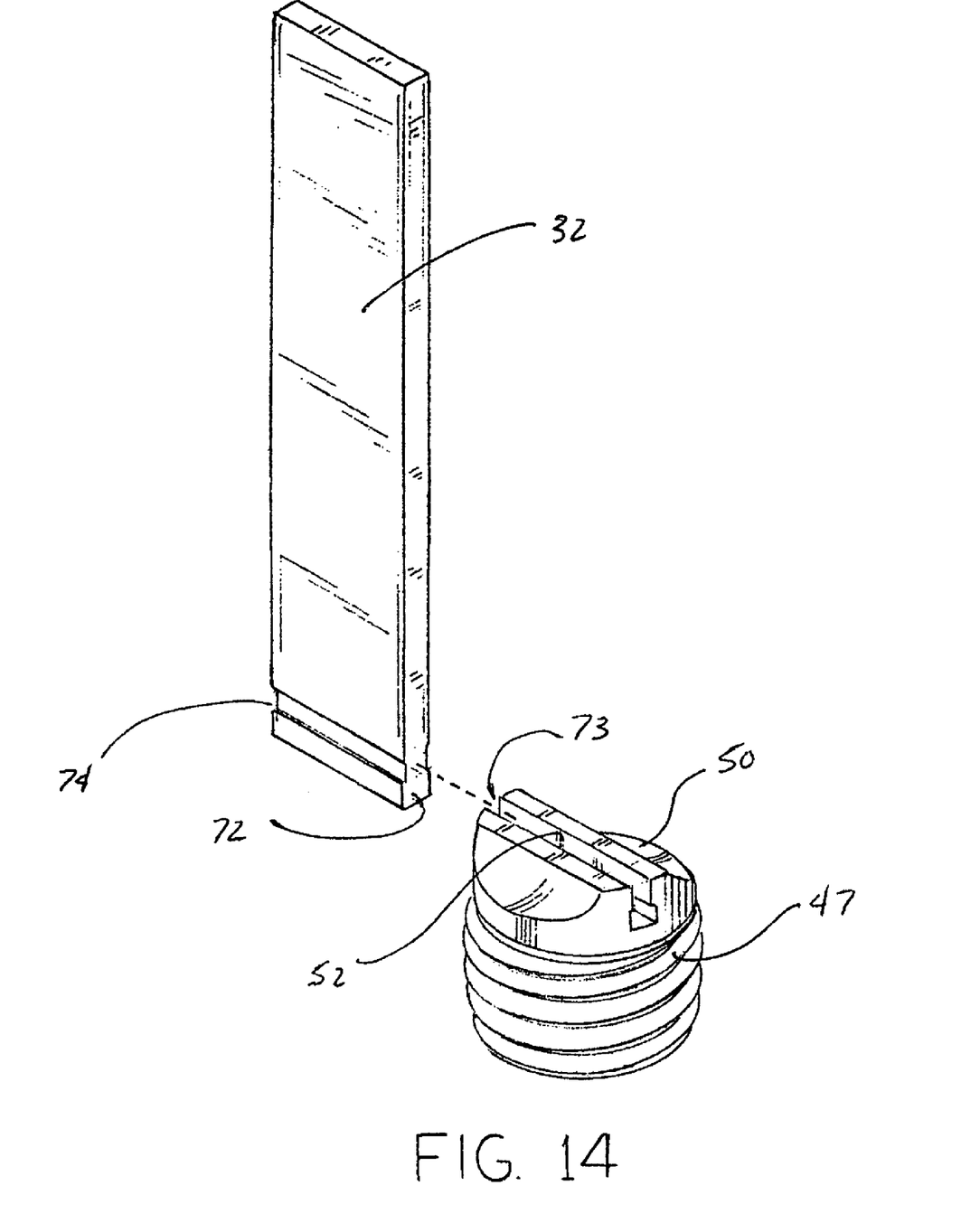
FIG. 14 is a pre-assembled perspective view of the plug baffle device of FIG. 2, with its fin-like blade about to be joined to its plug base.

As seen in FIGS. 13A, 13B, and 14, assembling blade 32 with plug base 47 is accomplished by introduction of leading edge 72 into channel entrance 73. As the fit is preferably a low-tolerance pressure fit, pressure must be applied to trailing edge 74 to urge blade 32 transversely into channel 52 and interlocking engagement with plug base 47.

Figure 15:
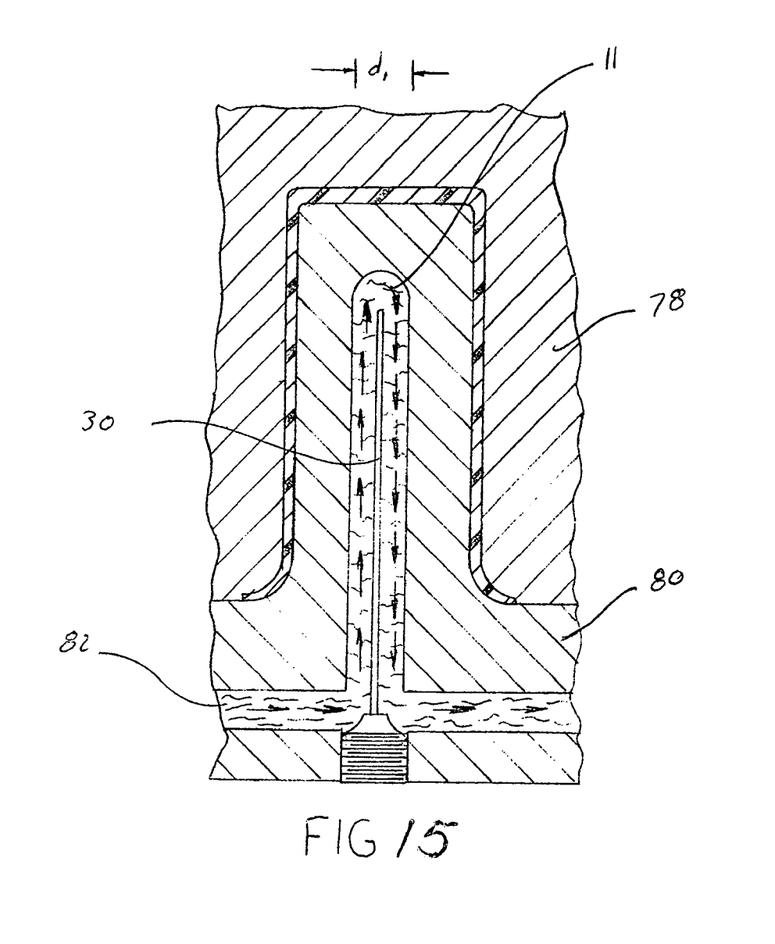
FIG. 15 is a side sectional view of a straight-bladed plug baffle device of this invention, installed in a cooling chamber of a mold.
Figure 16:
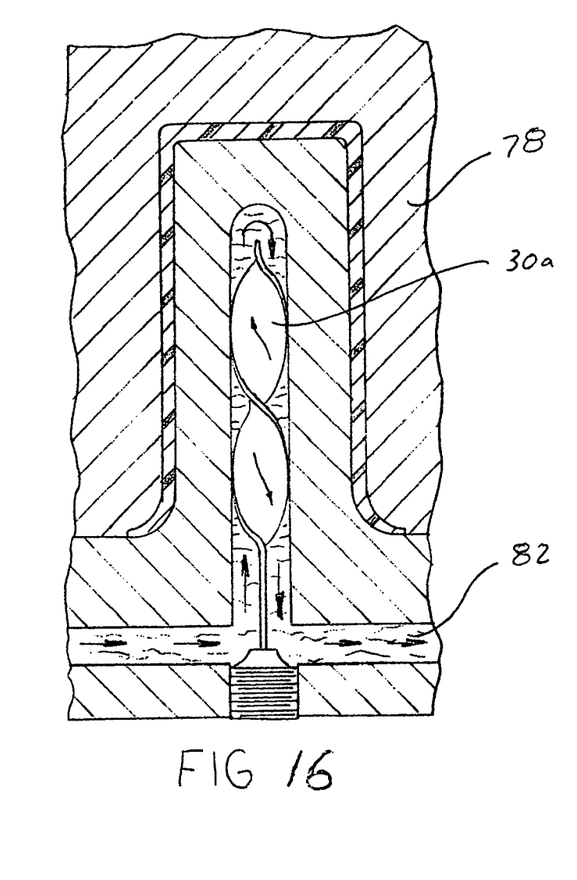
FIG. 16 is a side sectional view of a helical-bladed plug baffle device of this invention, installed in a cooling chamber.

FIG. 15 shows plug baffle device 30 installed in cooling chamber 11 of a mold. The mold has a cavity half 78 and a core half 80, forming a mold cavity therebetween into which molding material is injected. Circulating within cooling chamber 11 is coolant 82, typically water. Plug baffle device 30 directs coolant flow within cooling chamber 11 to cool core half 80. FIG. 16 shows a plug baffle device 30a which has a helical blade to directing coolant flow within cooling chamber 11 in the mold.

While the principles of the invention have been shown and described in connection with but a few embodiments, it is to be understood clearly that such embodiments are by way of example and are not limiting.

The invention claimed is:

1. A plug baffle device for installation in a coolant passage of a mold, the plug baffle device comprising a coolant-encountering fin and a separate base member is tolerance-fit tight mechanical mating engagement therewith, the mating engagement being accomplished by male and female interconnecting members and the base member having a mold-connecting portion adapted for sealing closure with the mold.

2. The plug baffle device of claim 1 wherein the base member has first and second ends and includes:
   a mold-connecting portion that is substantially cylindrical, has a threaded outer surface, and defines a tool-engaging socket opening at the first end of the base member; and
   an extension portion that extends from the mold-connection portion to form the second end of the base member, the extension portion having one of the male and female interconnecting members.

3. The plug baffle device of claim 2 wherein the tool-engaging socket has an axial depth which is at least 80% of the axial length of the threaded outer surface.

4. The plug baffle device of claim 3 wherein the male interconnecting member is integral with the coolant-encountering fin and the female interconnecting member is integral with the base member.

5. The plug baffle device of claim 4 wherein:
   the female interconnecting member defines a fin-receiving channel having a channel cross-section; and
   the male interconnecting member has a base-engaging portion with a base-engaging-portion cross-section complementary to the channel cross-section.

6. The plug baffle device of claim 5 wherein the base-engaging-portion cross-section is T-shaped.

7. The plug baffle device of claim 3 wherein the tool-engaging socket has an axial depth which is at least 90% of the axial length of the threaded outer surface.

8. The plug baffle device of claim 2 wherein the extension portion narrows in cross-dimension toward the fin, thereby to provide lateral flow space adjacent thereto.

9. The plug baffle device of claim 1 wherein the base member has first and second ends and includes:

a mold-connecting portion that is substantially cylindrical, has a threaded outer surface, and defines a tool-engaging socket opening at the first end of the base member; and an extension portion that extends from the mold-connection portion to form the second end of the base member, the coolant-encountering fin being attached thereto.

10. A plug baffle device for installation in a coolant passage of a mold, the plug baffle device comprising:

a coolant-encountering fin; and a base member mechanically attached thereto, the base member having first and second ends and including (A) a substantially cylindrical mold-connection portion which has a threaded outer surface and defines a tool-engaging socket opening at the first end of the base member, the tool-engaging socket having an axial depth which is at least 80% of the axial length of the threaded outer surface, and (B) an extension portion that extends from the mold-connection portion to form the second end of the base member, the coolant-encountering fin being attached thereto.

11. The plug baffle device of claim 10 wherein the tool-engaging socket has an axial depth which is at least 90% of the axial length of the threaded outer surface.

12. The plug baffle device of claim 10 wherein the extension portion narrows in cross-dimension toward the fin, thereby to provide lateral flow space adjacent thereto.

13. A plug baffle device comprising:

a coolant-encountering fin having a base-member-engaging portion; and a separate base member defining an axis and defining a female fin-receiving portion which is in tolerance-fit tight mechanical mating engagement with the fin.

14. The plug baffle device of claim 13 wherein:

the female fin-receiving portion defining a fin-receiving space which has an axially-facing entrance of first cross-sectional area, the fin-receiving space having a second cross-sectional area axially spaced from the entrance, the second cross-sectional area being greater than the first cross-sectional area; and the base-member-engaging portion of the fin has a third axial cross-sectional area greater than the first cross-sectional area, thereby preventing axial disengagement of the fin from the base member.

15. The plug baffle device of claim 14 wherein:

the base-member-engaging portion has a trans-axial cross-sectional shape which is substantially constant along at least a segment of the width thereof; and the fin-receiving space is a trans-axial channel configured and arranged to be substantially complementary to the base-member-engaging portion.

16. The plug baffle device of claim 15 wherein the trans-axial cross-sectional shape is T-shaped.

17. The plug baffle device of claim 13 wherein the fin has a coolant-contacting portion which is plate-like.

18. The plug baffle device of claim 13 wherein the fin has a coolant-contacting portion which is helical.

19. The plug baffle device of claim 13 wherein the base member has first and second ends and includes:

a mold-connecting portion that is substantially cylindrical, has a threaded outer surface, and defines a tool-engaging socket opening at the first end of the base member; and an extension portion that extends from the mold-connection portion to form the second end of the base member, the coolant-encountering fin being attached thereto.

20. A plug baffle device comprising:

a coolant-encountering fin having a base-member-engaging portion; and a base member mechanically attached thereto and defining an axis, the base member having first and second ends and including (A) a substantially cylindrical mold-connection portion which has a threaded outer surface and defines a tool-engaging socket opening at the first end of the base member, the tool-engaging socket having an axial depth which is at least 80% of the axial length of the threaded outer surface, and (B) an extension portion that extends from the mold-connection portion to form the second end of the base member and forms a female fin-receiving portion with which the base-member-engaging portion of the fin is mechanically attached.

21. The plug baffle device of claim 20 wherein the tool-engaging socket has an axial depth which is at least 90% of the axial length of the threaded outer surface.

22. The plug baffle device of claim 20 wherein the extension portion narrows in cross-dimension toward the fin, thereby to provide lateral flow space adjacent thereto.

* * * * *